July 18, 1972  N. M. HIRSCH  3,677,710
APPARATUS FOR WASHING BLOOD CELLS
Filed June 2, 1969  7 Sheets-Sheet 6

United States Patent Office 3,677,710
Patented July 18, 1972

3,677,710
APPARATUS FOR WASHING BLOOD CELLS
Nathan M. Hirsch, Wallington, N.J.
(33 Pond Ave., B–820, Brookline, Mass. 02146)
Filed June 2, 1969, Ser. No. 829,385
Int. Cl. A61m 1/03
U.S. Cl. 23—258.5               5 Claims

ABSTRACT OF THE DISCLOSURE

A method and apparatus for automatically performing the Coombs anti-human globulin test in a continuous flow system. Central to both the method and the apparatus is a new cell washing technique which permits continuous washing of the cells that are to be reacted with the Coombs serum. This technique involves gravitational settling and separation of aggregated cells from a supernatant material. The gravitational separation step is also used to separate the agglutinated cells from the dissociated cells after a Coombs reaction has taken place.

---

The invention described herein may be manufactured and used by or for the Government of the United States of America for governmental purposes without the payment of any royalties thereon or therefor.

This invention relates to blood testing and, more specifically, to a method and apparatus for automatically washing red blood cells and subsequently performing the Coombs anti-human globulin test by a continuous flow process.

The anti-human globulin (Coombs) test is a test designed to detect the presence and strength of antibody on red blood cells. In this test, red blood cells and serum containing antigens and antibodies, respectively, come in contact so that antibodies from the serum can coat the surfaces of those red blood cells containing complementary antigens. The red blood cells coated with antibody are first washed to remove non-specific protein and then reacted with an anti-human globulin. In this reaction, anti-human globulin aggregates those cells coated with antibodies so as to produce visible clumping while leaving uncoated cells dissociated. The number of remaining dissociated cells in a given sample is inversely related to the amount of antibody coating on the aggregated cells. Continuous flow processing is made possible by a continuous blood washing process which removes nonspecific protein from the cells prior to subjecting the coated cells to anti-human globulin.

In this continuous flow process, a mixture of red blood cells and serum is first washed in either a low ionic, a low pH or a low electrolyte solution or indeed in any solution capable of causing aggregation of blood cells. When the sample is subjected to the wash solution, aggregation of the red blood cells occurs. These cells are separated by gravity in a settling coil from which they are collected to be washed again. After a series of wash cycles, the aggregated red blood cells are reacted with a hypertonic, high pH or high electrolyte solution of anti-human globulin serum. This hypertonic solution disperses red blood cells not coated with antibody and maintains aggregation of those cells having antibody coatings. This aggregation in the case of the anti-human globulin reaction is called "agglutination."

In the subject invention, either the amount of agglutinated cells or the amount of dispersed or dissociated cells may be measured to give an indication of the strength of the antigen-antibody reaction. It will be appreciated that there are a number of measuring techniques to ascertain the amount of agglutinated or dissociated cells involving both direct and indirect measuring methods. In either test, the amount of agglutinated or dissociated cells indicates the amount of antibody coating the original red blood cells and thus the presence and strength of the complementary antigen coatings on these cells. In one configuration, the dissociated cells are allowed to pass to a hemolyzing agent. The optical density of the hemolysate is measured in a colorimeter which indicates the amount of hemogloblin present, i.e., the concentration of dissociated red blood cells or cells not coated with antibody. From this concentration, the amount of antibody coating the cells of the original serum-cell mixture can be determined. In another configuration, the dissociated cells, instead of being hemolyzed, are counted by a cell counter to determine the number of aggregated or antibody coated cells. This computation is accomplished by subtracting the counted number of dissociated cells from the number of cells in the original sample. This number is proportional to the amount of antibody coating the original red blood cells.

A further readout is accomplished by depositing both the dissociated and the aggregated cells onto filter paper. This paper absorbs the dissociated cells leaving the aggregated cells as a direct indication of antibody coating. Alternately, a continuous flow filter may filter out the dissociated cells leaving the agglutinated cells as a measurable residue.

Central to the subject continuous flow process is a wash method or technique which involves gravitational settling and separation of aggregated cells from a supernatant material. In performing either the direct or indirect Coombs test, uncombined serum globulins, sometimes called "nonspecific proteins," must be washed from the red blood cells so that the Coombs serum or anti-human globulin can be effective to produce measurable clumping of red blood cells when the antigen-antibody reaction occurs. If these cells are not washed, the Coombs serum is absorbed by the nonspecific proteins. In the subject invention, settling coils are used to separate the aggregated red blood cells which represent the "washed" cells from the supernatant fluid which is composed of nonspecific protein dissolved in wash solution. The operative force is the local gravitational force field which is sufficient to separate the aggregated cells from the lighter wash solution. Gravitational separation thus replaces, the cumbersome batch wash process which requires centrifuging. This method allows continuous preparation of washed cells to be reacted with the Coombs serum.

The Coombs test, in addition to being a valuable and sensitive laboratory technique for detecting variant properties of blood, is used clinically in the diagnosis of erythroblastosis, acquired hemolytic anemia, isoimmunization due to pregnancy, and incompatible transfusions as well as in routine blood transfusion compatibility testing. Automation of the Coombs test as taught herein permits the use of this test on a routine inexpensive basis as well as providing quantitative test results.

It is another object of this invention to provide a method for washing blood cells which involves gravitational settling and separation of aggregated cells from a supernatant material.

It is still another object of this invention to utilize a settling coil in the washing of red blood cells.

It is a further object of this invention to provide apparatus for separating agglutinated cells from unagglutinated cells.

Another object of this invention is to provide an expanded chamber fitting used in introducing wash solution into blood-serum mixtures.

A final object of this invention is to wash red blood cells by maintaining an appropriately polarized electrostatic field across a volume of these cells in a normal wash solution.

Other objects, advantages and novel features of the invention will become apparent from the following detailed description thereof when considered in conjunction with the accompanying drawings in which like numerals represent like parts throughout and wherein.

INTRODUCTION

In 1901, K. Landsteiner demonstrated that human blood could be typed by agglutination reactions. These reactions involve reacting antigens coating red blood cells with certain antibodies in a serum. When the appropriate antibody is used agglutination or visible clumping of the red blood cells occurs, indicating the presence of a specific antigen in the blood. There is a group of antibodies, called "incomplete antibodies," which react with antigens in the blood without causing visible clumping or agglutination.

The Coombs serum, in essence, acts as a binding agent when "incomplete antibodies" are reacted with antigens. This serum, by a process that is not fully understood, allows the "incomplete antibody," either added or naturally occurring, to react with specific antigens coating the blood cell in such a manner that agglutination or visible clumping occurs. In general, antibody-antigen reactions are carried out in a saline solution although high proteins such as albumin and enzymes such as bromelin, trypsin or ficin may be used. "Incomplete antibodies," while capable of reacting with specific antigens coating the blood cell, will not do so in any of the usual media. When incomplete antibodies are reacted with complementary antigens in such a medium, an antibody coating is formed around each red blood cell, but no clumping or agglutination results.

Also coating the red blood cell are nonspecific proteins or uncombined serum globulins. Because they are uncombined, they can be washed from the surface of the cell. They must be removed so that they will not combine with the Coombs serum to render it ineffective as a binding agent. If these nonspecific proteins are not removed, a false negative Coombs test reaction results. Prior to the subject invention, the serum-cell mixture was batch washed in isotonic solutions and centrifuged to remove nonspecific protein. This was a cumbersome process not well adapted to automatic processing.

As a substitute for batch washing, the present invention allows aliquots of blood separated by gas bubbles or a viscous liquid to be passed through a series of flow-through settling devices or settling coils which remove the uncombined globulins from the coated cells. The washed cells are then reacted with the appropriate anti-human globulin.

The flow-through settling device or settling coil is also used in place of the normal centrifuging technique to separate the agglutinated cells after the antigen-antibody coatings of the washed cells have been reacted with the Coombs serum.

The agglutinated cells are then pumped to a colorimeter of the type described in U.S. Pat. No. 3,031,917 to Milton H. Pelavin. When this colorimeter is used, quantitation of Coombs test results is possible where heretofore only a positive (clumping) or negative (no clumping) test could be performed.

The automation of the Coombs test depends on the ability to separate various samples of blood in a tube or conduit so that samples may be sequentially tested in a continuous flow process. One device which separates samples of blood is described in U.S. Pat. No. 3,230,776 to Jack Isreeli et al., issued Jan. 25, 1966, and 2,797,149 to Leonard T. Skeggs, issued June 25, 1957. This device is called an autoanalyzer. The Coombs test heretofore could not be performed in such a system because of the batch washing and centrifuging operations thought to be necessary. Although the subject invention may utilize the forced air bubble blood separating technique shown in these patents, the subject method need not be limted to sample separation by air bubbles. Viscous, nonreactive fluids conceivably could be used to separate the samples. In addition, only one sample need be fed through the subject apparatus at a time, thus eliminating the need for any sample separation. In addition to the coil apparatus, two new fittings have been devised; the first of which providing for the mixing of blood and wash solution and the latter for causing a large air bubble to be initiated into the system. In addition, cycling of wash solution between each sample in the direct test and wash solution plus known red cells in the indirect test serve to prevent contamination from one sample to the next due to extraneous coating of the tubes in the apparatus. These additional input components also help to establish base line levels to enable quantization of the test results.

METHOD

Figure 1:
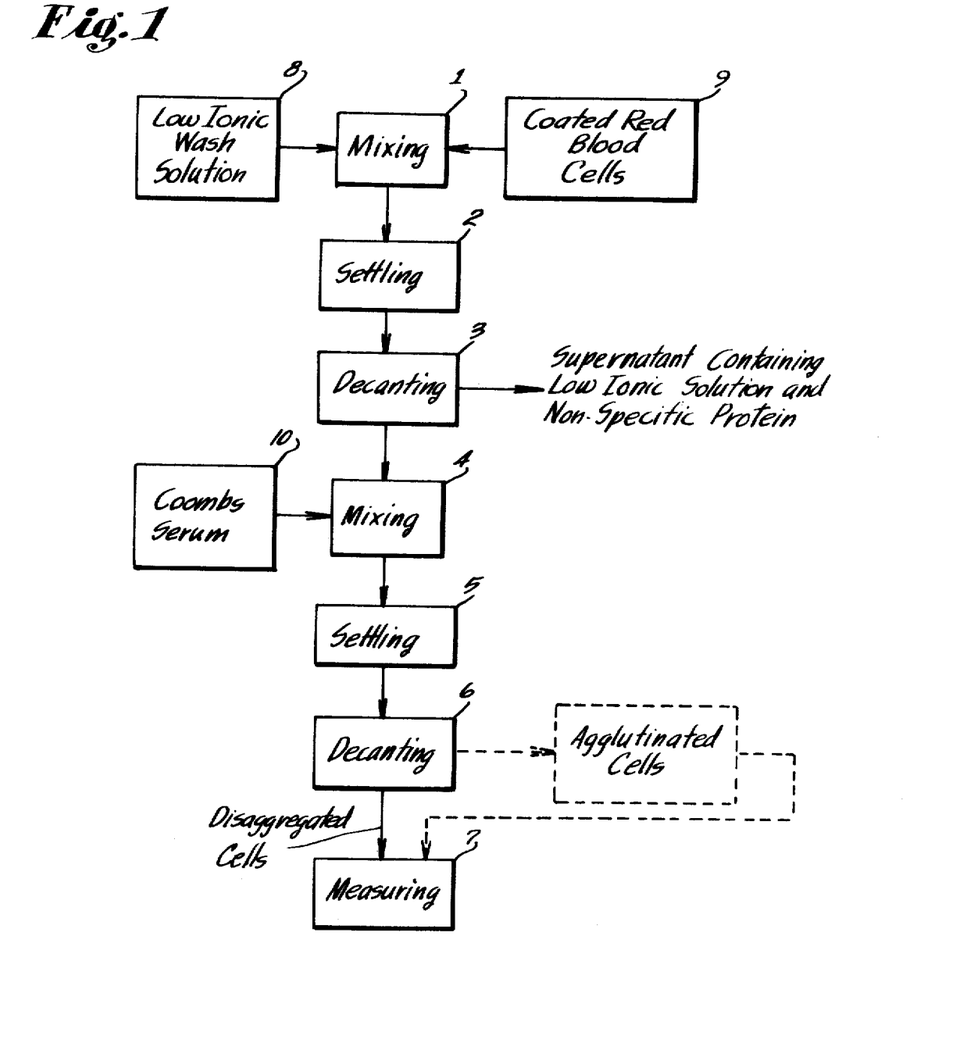
FIG. 1 is a block diagram of the method for performing both the direct and indirect Coombs tests.

FIG. 1 shows a new method of performing either the direct or the indirect Coombs test.

The direct Coombs test is primarily used to test for antibody which has coated red blood cells in vivo. It is a direct diagnostic tool in ascertaining erythroblastosis; in studies of acquired hemolytic anemia where antibodies produced by the patient may coat his own blood cells; and in testing for incompatible transfusions where the patient reacts to the transfusion of incompatible blood.

The indirect Coombs test is used to detect the presence of "incomplete antibody" in serum of persons sensitized to one or more blood antigens. It is also used in isoimmunization studies where the isoimmunization results from pregnancy. The indirect Coombs test may also be used in a sensitive cross-matching procedure to detect certain incompatible transfusion reactions not revealed by other blood matching techniques.

The first step in the subject method is the mixing of a predetermined serum-cell mixtures 9 with a low ionic wash solution 8 in order to remove the aforementioned nonspecific protein from the surface of the cell.

Figure 2A:
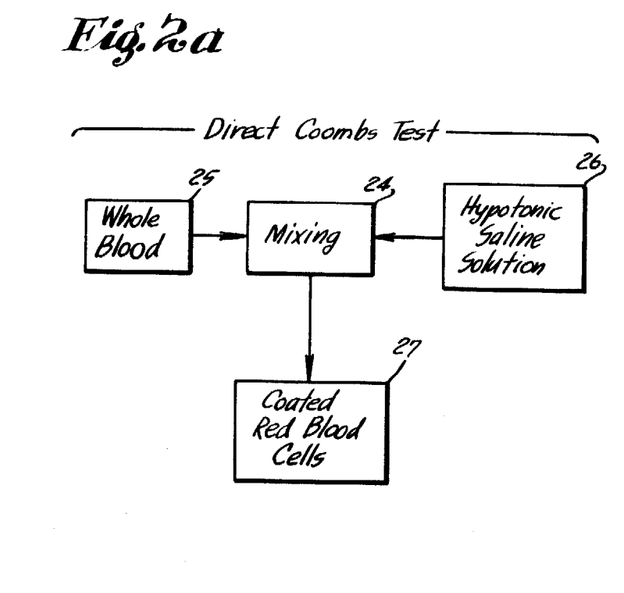
FIGS. 2a and 2b show a series of block diagrams which indicate two methods for obtaining coated red blood cells for use in the direct and indirect Coombs tests.
Figure 2B:
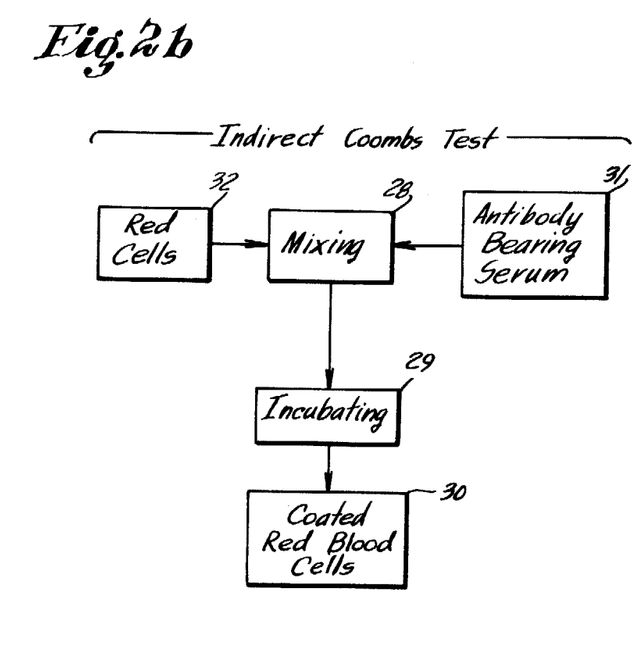

This serum-cell mixture which is composed of coated red blood cells may be obtained by either of the two methods shown respectively in FIGS. 2a and 2b. As shown in FIG. 2b in the indirect Coombs test, red cell aliquots 32 may be mixed at 28 with a particular antibody-containing serum 31 for which the cells are being tested. The red cell aliquots are usually suspended in 0.7 percent NaCl and 0.5 percent "Ficoll," a synthetic high polymer made by the copolymerization of sucrose and epichlorohydrin and available from Pharmacia Fine Chemicals, Inc., Piscataway, N.J., which is buffered to a pH of 7.2. The mixture of serum and red blood cells is incubated at 29 from seven minutes to 120 minutes at an incubation temperature of 37° C. This temperature may vary from within a range of ±2° to provide for maximum incubation. During the incubation, the antibody-containing serum coats those red blood cells which have a complementary antigen coating. This produces the coated red blood cells shown at 9 in FIG. 1 when complementary antigens and antibody exist in the serum-cell mixture. It is either this incubated mixture 30 or a mixture 27, shown in FIG. 2a, of whole blood 25 mixed at 24 with saline 26 or other solutions which are used in performing the Coombs test by the subject method. The Coombs test as it was originally performed required centrifuging after the mixing of the serum-cell mixture and the wash solution so as to separate this nonspecific protein from the cell surface. In the subject invention, a gravitational separating process replaces the centrifuging step as the second step in the method. In this step, the serum-cell mixture, diluted by the wash solution, is washed in a gravitational settling step. In this settling step, the cells are made to flow through a coil having an axis colinear with the local gravitational force field. Alternately, the cells may be made to flow in a closed conduit of any geometry as long as gravitational settling can occur. Vertically oriented coils provide for more efficient settling since longer lengths of conduit can be maintained perpendicular to the local gravitational field within a given housing.

The coated and/or uncoated red cells flowing through this coil aggregate because of the low ionic, low electrolyte or low pH wash solution. It is thought that the low ionic solution, in addition to separating out the nonspecific protein, brings the cells closer together so that the Coombs serum can be more effective. This is accomplished by reducing the charge on the red blood cells.

There are three classes of wash solutions which may be used. The first class of reagents includes low ionic solutions such as mannitol and sorbitol which work extra cellularly to effectively lower the red blood cell charge. Glycerol and glucose are two low ionic wash solutions which work intercellularly to achieve aggregation. Another class of reagents which includes polyvinyl pyrrolidone, polylycine and polybrene chemically react with the red cell membrane so as to enable the cells to aggregate or clump. The third class of reagents is that having a low pH effect. These include enzyme wash solutions which fall into either the high molecular weight protein category or are the proteolytic enzymes. Examples of high molecular weight protein wash solutions include albumin and methyl cellulose. Proteolytic enzymes include papain, ficin, nagerase, trypsin and bromelin. It will be appreciated that the wash solution need not be limited to the above-mentioned substances, but rather may be any solution capable of causing red cell aggregation.

As the cells proceed through the coil and as they aggregate they settle to the bottom of the coil leaving a supernatant solution floating above them. This supernatant material contains both wash solution and nonspecific protein and is decanted off when the aggregated cells reach the end of the coil.

In the third step of the subject method, when the aggregated cells reach the end of the coil, they are removed from the bottom surface of the coil both by gravity and a slight suction leaving the supernatant solution to be decanted. The cell washing steps of mixing, settling and decanting are shown diagrammatically at 1, 2 and 3 in FIG. 1.

The aggregated cells, now free of nonspecific protein, are mixed with a hypertonic volume of Coombs serum or anti-human globulin at 4. It will be appreciated that matching of a high pH Coombs serum with a low pH wash solution or a high electrolyte Coombs serum with a low electrolyte wash will enhance the Coombs reaction although a hypertonic solution will produce adequate results whatever the wash solution used. This hypertonic Coombs serum shown at 10 serves a two-fold purpose. The first is to disaggregate those cells that are not coated with antibody while at the same time and secondly maintaining the binding of those aggregated cells wihch are coated with antibody. In one explanation of this phenomenon, the Coombs serum acts as a bridge between two cells if the appropriate complementary antigen and antibody coatings are present on both. The anti-human globulin molecule is said to bind at one end to a specific site on one of these cells and at the other end to another site on the other of the cells so that clumping or agglutination can occur. As far as the use of normal anti-human globulin, it is possible that it will react with cells washed with the above-mentioned chemically active wash solutions.

After the Coombs serum has been mixed with the aggregated cells from the cell washing steps, the reaction product is again subjected to a settling step 5 which utilizes a second series of settling coils. At this step, aggregated cells are removed again by gravitation and suction at 6. The dissociated cells left are decanted at this time and the number of dissociated cells per unit volume is measured and/or recorded at 7 to determine the amount of antibody coating the original red cells.

Figure 3A:
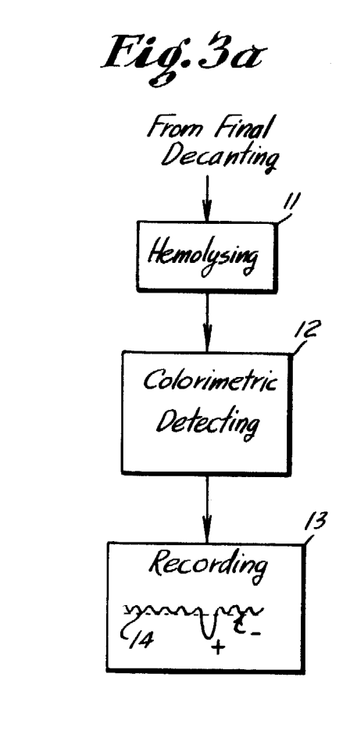
FIGS. 3a, 3b, 3c and 3d are a series of block diagrams showing four methods of measuring the results of the anti-human globulin reaction which indicate the amount of antibody coating the red blood cells tested.
Figure 3B:
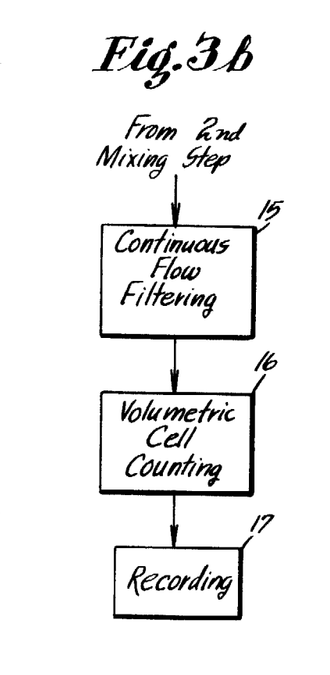
Figures 3C, 3D:
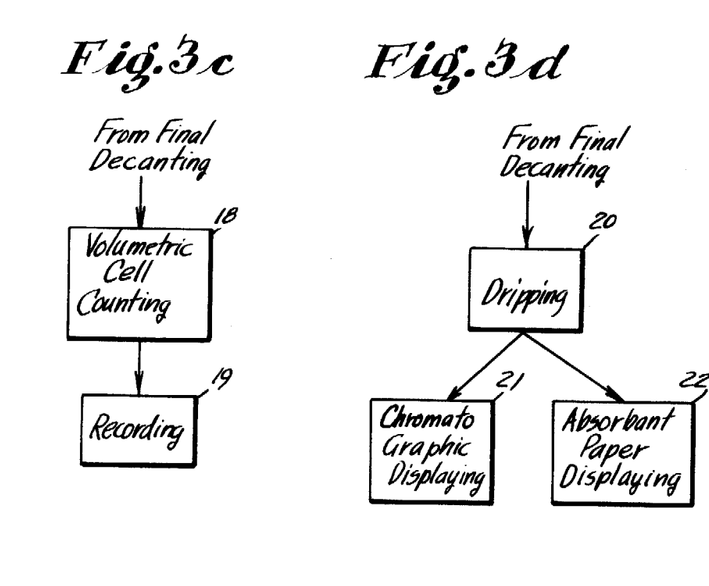

Three direct measuring techniques are shown diagrammatically in FIGS. 3b, 3c and 3d along with an indirect measuring technique in FIG. 3a. In this indirect technique, the amount of coating on the original red cells is determined by hemolyzing those unaggregated cells shown as the decanted solution entering measuring step 7 of FIG. 1. In this method of measuring, the cells hemolyzed at 11 are passed through a colorimeter 12 of the type described above. The hemolyzing agent may be any suitable hemolyzing reagent mixed with water. In one experimental embodiment, Triton X100 is used. The hemolyzed cells which are now dissociated and passed through the above-mentioned colorimeter reveal certain amplitude peaks and depressions indicating positive and negative Coombs tests. This is shown diagrammatically by the recording step 13. In order to calibrate this apparatus, a number of normal or uncoated red blood cell aliquots are tested. The peaks shown abutting dotted line 14 are the results from the testing of these normal cells. These peaks therefore establish a base line. Any peak appearing at this dotted line 14 is an indication of a negative Coombs test, while any peak falling below line 14 is a base line depression indicating a positive Coombs test. In the case of very weak coatings of antigens and antibodies on red blood cells, there may be a base line elevation. This occurs in rare instances because the Coombs serum disperses red cells having these very weak coatings rather than agglutinating them.

In the context of this application, a positive Coombs test indicates that an amount of a specific antibody is coating the original blood cells, thus indicating that the red cells are of a specific type. A negative Coombs test indicates that none of the antibodies in a given serum are coating the red blood cells, also indicating that the red blood cells are of a specific type.

Alternately, a direct volumetric determination of the amount of dissociated cells may be performed by passing the dissociated cells through a continuous flow filter immediately after the Coombs serum is mixed with the coated red blood cells. This is an additional step shown as number 15. The amount of filtrant can be visually assayed by reaction with litmus paper or through other chromatographic techniques. Alternately, electronic volumetric cell counting 16 may also be performed on the mixed solution consisting of agglutinated red cells. An electronic cell counter of the type described in the Technicon Instrument Corporation Authorized Federal Supply Schedule Catalogue, July 1, 1968–Jan. 31, 1969, determines the charge of and thus the number of agglutinated cells in a given volume. The results of this test can be easily recorded on a strip chart recording device 17 to yield a display similar to the plot shown in recording step 13.

If a decanting operation is included, a direct volumetric count can be made of the supernatant material from the settling step by the cell counter shown at 18. This cell count may be recorded at 19 similarly to the recording at 17. In either of the above two direct methods, the amount of either dissociated or agglutinated cells is measured quantitatively. Qualitative visual testing can be accomplished by dripping, 20, the substance from the final settling step onto either chromatographic paper shown at 21 or onto an absorbent filter paper 22. In the case of the chromatographic paper, color indicates the strength of the Coombs reaction while the amount of aggregated cells lying on top of the filter paper gives a qualitative visual method of ascertaining the strength of the reaction.

Because in the subject invention the older centrifuging technique has been supplanted in two instances by settling steps, results obtained by the subject method are quantitative and thus more reliable than visual testing procedures associated with the batch processing technique.

The method described above has great utility in the cross matching of blood. In order that a compatible transfusion be given, blood of substantially the same type as that of the recipient must be located. For the more common blood type groupings, cross matching is routine. As more and more is known about blood types, a more sensitive cross matching technique is necessary. The antihuman globulin test performed by the subject method is such a sensitive technique. In this technique, red cells from the potential recipient are reacted with serum from the blood to be transfused to form the serum-cell mixture used in the subject method. A negative reaction as indicated by a peak lying along dotted line 14 indicates compatibility of the sample blood with that of the recipient. If this peak falls below line 14, incompatibility is indicated and either further tests must be performed or new samples must be tested. The subject method when used with the apparatus to be described allows efficient testing of a large number of samples to find one which is fully compatible with the recipient's blood.

The subject method may also be used as a check on incompatibility after blood has been transfused. In this case, minutes or hours after the transfusion antibodies in the incompatible transfused blood coat the red blood cells of the recipient. Blood taken from this recipient when processed by the subject method will yield either a positive or negative test result. Therapeutic measures may be quickly taken once a positive condition is known to exist. Again, the subject method when used with the apparatus to be described allows relatively instantaneous determination of incompatibility. Automatic processing apparatus utilizing this new method of performing the Coombs test is now described.

It will be appreciated that although the subject method is best adapted to automatic processing, it may be carried out in an unautomated series of steps when the number of tests to be performed does not justify the expenditure of finds on a fully automated system.

APPARATUS

Figure 4:
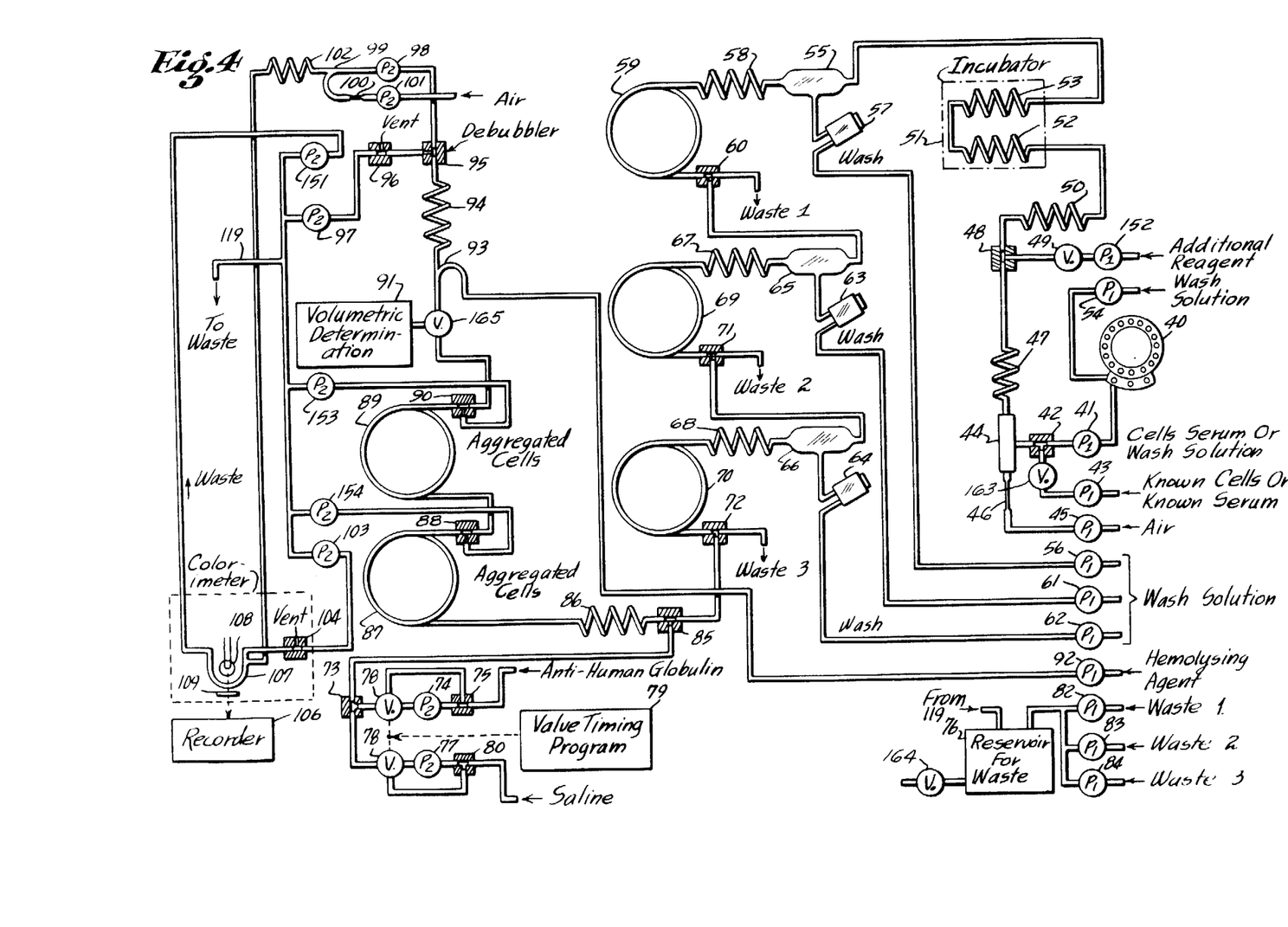
FIG. 4 is a schematic diagram showing one possible embodiment of automating the method shown in FIG. 1.

Apparatus has been devised to automate the subject method in a continuous flow process. It is through this apparatus that more than 30 blood samples can be tested and analyzed per hour. Although the apparatus to be described may be utilized in performing both the direct and indirect Coombs tests, the diagram in FIG. 4 is that of a device for performing the indirect Coombs test since it is the more complicated of the two.

In the indirect Coombs test, samples of serum which may or may not contain antibodies are deposited in chambers in a circular tray. These chambers are open upwardly so as to permit the insertion of a sampling probe into the open portion of the chamber as the chamber rotates about a central axis. Also in this tray and interspaced between the serum samples are samples of red blood cells containing a known antigen. The purpose of these cells is primarily a washing function which is necessary to prevent contamination from one serum sample to the next. These cells are also used to obtain a base level for quantitative measurements. Both of these functions will be described in greater detail in connection with FIGS. 5a and 5b. Details of this type of sampling apparatus are shown in U.S. Pat. No. 3,230,776, issued to J. Isreeli on Jan. 25, 1966. This liquid sampling device is shown diagrammatically at 40 in FIG. 4. Prevention of the aforementioned contamination is also provided by interspersing wash solution between each of the samples located in the tray. This is accomplished by alternately dipping the probe into the sample and then into a wash bath shown entering device 40 from pump 54. Samples from this device are forced by a peristaltic pump 41 into the top portion of a T connector 42. In from the bottom of the T connector is pumped a continuous flow of the same red cells containing a known antigen of the type mentioned above.

It will be appreciated that unknown cells could be placed in device 40 and tested against a known serum pumped in at 43. Likewise, the cells containing known antigens could be introduced through device 40 and serums of unknown antibody coatings pumped in through pump 43 although this would be somewhat inefficient.

It is obvious, therefore, that device 40 may be used in a variety of ways to introduce the necessary components for the direct and indirect tests. The subject apparatus is thus capable of ascertaining not only what serum contains a given antibody but also what red blood cells contain a given antigen.

The pump utilized to pump the samples throughout this apparatus may be a single peristaltic pump with a multiplicity of lines running therethrough. In the embodiment shown, two peristaltic pumps, labeled P1 and P2, are shown. Two pumps were used because one pump having a sufficient multiplicity of lines has proved to be prohibitively expensive. These pumps were made to run at the same speed and were thus in approximate synchronism. It will be further appreciated that individual pumps may be used. Individual pump boxes are shown for clarity of description.

A cutoff valve is shown at 163 which permits the running of a direct Coombs test. This valve is closed when a direct Coombs test is performed since serum antibody is already coating the red cells taken from the human body. In both the direct and indirect Coombs tests, the serum and red cells are dripped into a drip fitting 44 to be described in greater detail by FIG. 8. In this connector, the blood-serum mixture is dripped down the sides of fitting 44 until an air bubble coming upwardly forces the blood sample towards mixing coil 47. The air entering fitting 44 is periodically pumped in timed sequence with pump 41 so that the air bubble and the blood sample arrive at fitting 44 at approximately the same time. This air is delivered through a peristaltic pump 45 and is channeled through a pulse suppression, restricted orifice fitting 46 to fitting 44. This produces a smooth air bubble separation when pumps 41, 43 and 45 are properly synchronized. This synchronism is automatic if a single peristaltic pump is used. As described hereinafter, fitting 44 effectively elongates the air bubble thus providing even greater separation between the samples. In one practical embodiment, sample separations of 10 centimeters or more can be achieved. The separated aliquots of blood and serum are subsequently mixed in a flow-through mixing device consisting of a horizontal mixing coil 47 which is of the type described in U.S. Pat. No. 3,427,135, issued to M. H. Pelavin et al. on Feb. 11, 1969. The designation "horizontal" is used to distinguish mixing coils from the settling coils to be described hereinafter. These coils, even if vertically oriented, are usually of such a small diameter that settling could not occur. Subsequent to this mixing step, the fluid is passed through another T fitting 48 at which time an additional reagent may be added when valve 49 is in its open position. In the direct Coombs test, this additional reagent may be the saline solution. Any necessary lubricant may be added through this fitting although it may be added at any point in the system. Additionally, any reagent which heightens the Coombs reaction may be added at this point. One such reagent is albumin although its introduction into the subject apparatus is usually unnecessary. Horizontal mixing coil 50 is provided to thoroughly mix in any reagent added at this point. It will be appreciated that further mixing of any of the fluids mentioned herein will not adversely affect the separation of the samples when introduced at a low pressure. From coil 50 the mixture flows through an incubator 51 which in one embodiment is a series of horizontal coils 52 and 53 immersed in a 37° C. bath. Alternatively, jacketed coils may be used at this point. The timing of the fluid flow is set such that the blood and serum mixture is incubated for approximately 12 minutes. This incubation time, set by the length of coils 52 and 53, may range anywhere from seven to 120 minutes at 37° C. In the direct Coombs test, this step may be bypassed.

At this point the apparatus has prepared samples of coated red blood cells which must be washed and reacted with the aforementioned Coombs serum.

The washing of the red cells takes place in a settling step or group of steps depending upon the length of tubing utilized in the settling coils to be described. The incubated blood aliquots are connected to one end of a special expanded chamber fitting 55 described in detail in FIG. 7. This fitting may be considered as part of the aforementioned flow-through mixing device when it is connected to a horizontal mixing coil of the type described. From the bottom of this fitting is pumped the low ionic wash solution hereinbefore described by pump 56. Between pump 56 and fitting 55 is another type of pulse suppressor 57 which operates to smooth the input to fitting 55. This suppressor is composed of a chamber with intake and output ports and is filled to a level above the output port. The expanded chamber of fitting 55 allows a large amount of the wash solution to be mixed into the serum-cell mixture so that more efficient washing can take place. When the wash mixture is introduced into this chamber, the air bubble separating the aliquots is not disturbed. This occurs because the air bubble pressure is greater than the pressure of the wash solution introduced into this chamber. The diluted blood sample becomes elongated at the far restricted end of the chamber while the size of the air bubble does not change as it emerges from this chamber. The low ionic solution is mixed with the serum-cell mixture at horizontal mixing coil 58 and the mixed aliquots, still separated by air bubbles, forced into settling coil 59. The operation of the settling coil is described in detail in FIG. 6. Settled aggregated cells are removed by a decant fitting 60 which is a T-type fitting with a restricted trunk or base. The aggregated red blood cells are siphoned off through this restricted trunk while the supernatant, which consists of wash solution and nonspecific protein, is expelled from the other end of the crossed portion of the T. This waste is pumped to waste reservoir 76 through pump 82 at a rate low enough so as not to disturb the aggregated cells. This reservoir may be drained by valve 164. It will be appreciated that in a peristaltic pump, pump pressure can be regulated by the size of the tubing used. In one embodiment, the red cells are washed three times by a set of three coils connected in series. This involves the use of pumps 61 and 62; pulse suppressors 63 and 64; expanded chamber fittings 65 and 66; mixing coils 67 and 68; settling coils 69 and 70; decant fittings 71 and 72; and pumps 83 and 84.

At this point in the system, washed red blood cells are available to be reacted with the aforementioned hypertonic Coombs serum. The appropriate hypertonic solution need only be introduced when the aliquots of washed red blood cells are passing through T connector 85. While anti-human globulin could be continuously pumped into connector 85, the cost of this method is prohibitive due to the relatively high cost of the Coombs serum. In the present apparatus, Coombs serum is pumped into the above-mentioned connector only when washed red blood cells which have been reacted with normal serum or serum possibly containing antibody are present. This requires a certain timing in connection with the introduction of the Coombs serum. As mentioned above, aliquots of washed red blood cells are not the only aliquots passing through the settling coils. In the indirect Coombs test, aliquots of wash solution as well as aliquots of red blood cells having known antigen coatings are passing through the system. Since it is unnecessary to react these components with the Coombs serum, they are reacted with a hypertonic solution of saline which produces the same results as the anti-human globulin with regard to disaggregation of cells and is considerably less expensive.

In order that the Coombs serum and the saline solution can be alternately introduced into the system, a hybrid pumping system has been devised. In this pumping system, anti-human globulin is pumped through pump 74 to one half of a DPDT-like valve 78. The saline is pumped through pump 77 to the other half of this valve. This valve which is controlled by a valve timing program 79 operates in the first half of its cycle to pass the anti-human globulin to connector 73 while at the same time prohibiting the flow of saline to this connector. This saline is at the same time recirculated through pump 77 through T connector 80. At the appropriate time, valve 78 is turned to the other of its two positions. In this position, the anti-human globulin flowing through pump 74 is recirculated through T fitting 75 while the saline is now permitted to pass to connector 73. In this manner, the above reactants are fed through connector 85 to the flow from the settling coils. In one embodiment (not shown), valve 78 is a quadruple-chamber, solenoid-actuated valve. This valve contains a single diaphragm for alternately connecting the anti-human globulin and saline to connector 73.

The Coombs serum is mixed with the output of the abovementioned settling coils in a horizontal mixing coil 86 of the type described above. The above mixture is then coupled to settling coil 87 where the Coombs serum causes agglutination of cells. These cells settle as did the cells in coils 59, 69 and 70. Agglutinated cells are drawn off at 88 through pump 154 and line 119 to reservoir 76 and the dissociated cells decanted. These decanted cells pass to a further settling coil-decanting operation 89, 90 and 153. It is possible to obtain a complete Coombs reaction with only one settling operation. Here two settling operations are shown and are usually included to increase the reliability of the test. The dissociated cells may now be directed by valve 165 to be individually counted by apparatus 91 described previously in connection with FIG. 3. Alternately, and prior to decanting, the dissociated cells may be filtered and measured as also described in FIG. 3.

In one embodiment, the dissociated cells are hemolyzed. The hemolyzing agent is pumped in at 92 through an "h" fitting 93 so as to cause maximum turbulence in the mixing of the hemolyzing agent. The hemolysis is allowed to continue in a horizontal mixing coil 94 of the type hereinbfeore described. The hemolyzed cells are still separated by bubbles of air. These air bubbles are removed by debubbler 95 which is a restricted orifice T section fitting used in combination with a restricted orifice fitting 96. Fitting 95 is oriented with the stem of the T pointing upwardly. As one of the air bubbles passes the junction of this T, the air bubble rises through the stem carrying with it only a negligible portion of the fluid entering from the settling coil. Any fluid which does come up through the stem is pumped off with a slight pump pressure through fitting 96 and pump 97 while the air is vented through the restricted orifice of fitting 96. The hemolyzed cells are repumped at 98 to overcome the internal resistance of the tubing and a new air bubble introduced through "h" fitting 99, pulse suppressor 100 and pump 101. The introduction of air at this point is necessary to separate the blood samples until they are coupled to the colorimeter where the air bubble is again removed by fitting 104 and pump 103. This hemolyzed cell solution separated by air bubbles is mixed at 102 to obtain a uniform mixture prior to coupling it to the flow tube in a colorimeter of the type described in U.S. Pat. No. 3,427,135 to M. H. Pelavin on Feb. 11, 1969 and U.S. Pat. No. 3,031,917 by the same inventor issued on May 1, 1962. This colorimeter, which measures the optical density of the hemolysate, is composed of a flow tube 107, a light source 108 and a photodetector 109. The results of the colorimetry test are displayed on a strip chart recorder 106 of the type also described in U.S. Pat. No. 3,031,917, mentioned above.

In one embodiment, settling coils 59, 69, 70, 87 and 89 consisted of two and one-half turns of 2.0 millimeter tubing, each coil having an approximate diameter of 16 centimeters. Mixing coils 47, 50, 58, 67, 68, 86, 94 and 102 consisted of a number of turns of 2.0 millimeter tubing, each coil having an approximate diameter of three centimeters.

Figure 5A:
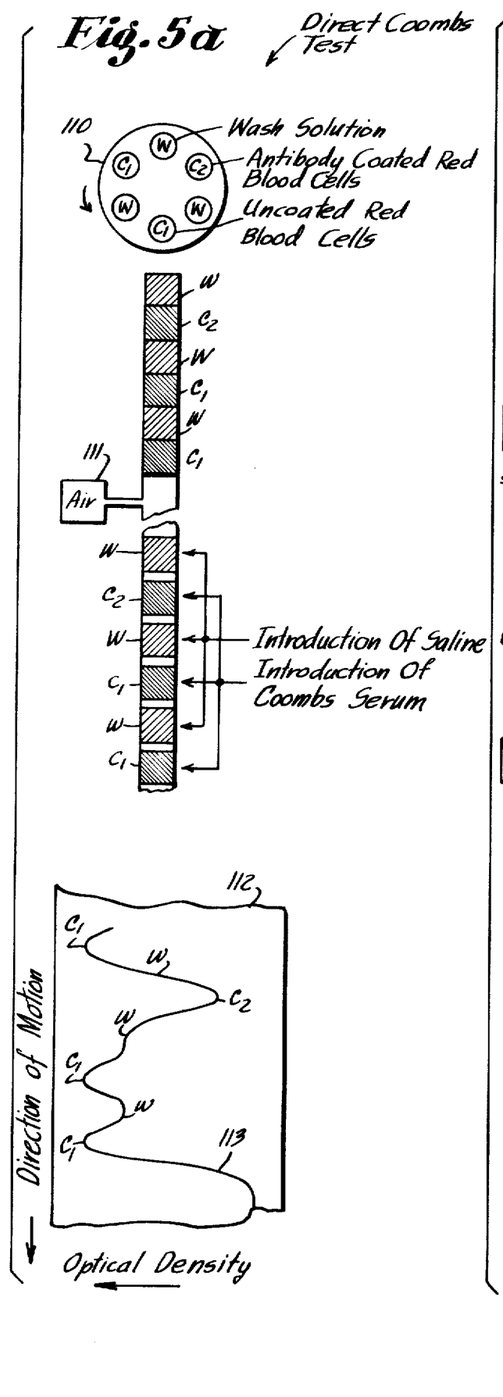
FIGS. 5a and 5b are a combined diagram showing the inputs and the outputs of the apparatus shown in FIG. 4 when it is used to perform the direct and indirect Coombs anti-human globulin tests including self-cleaning materials used in multiple sample processing.
Figure 5B:
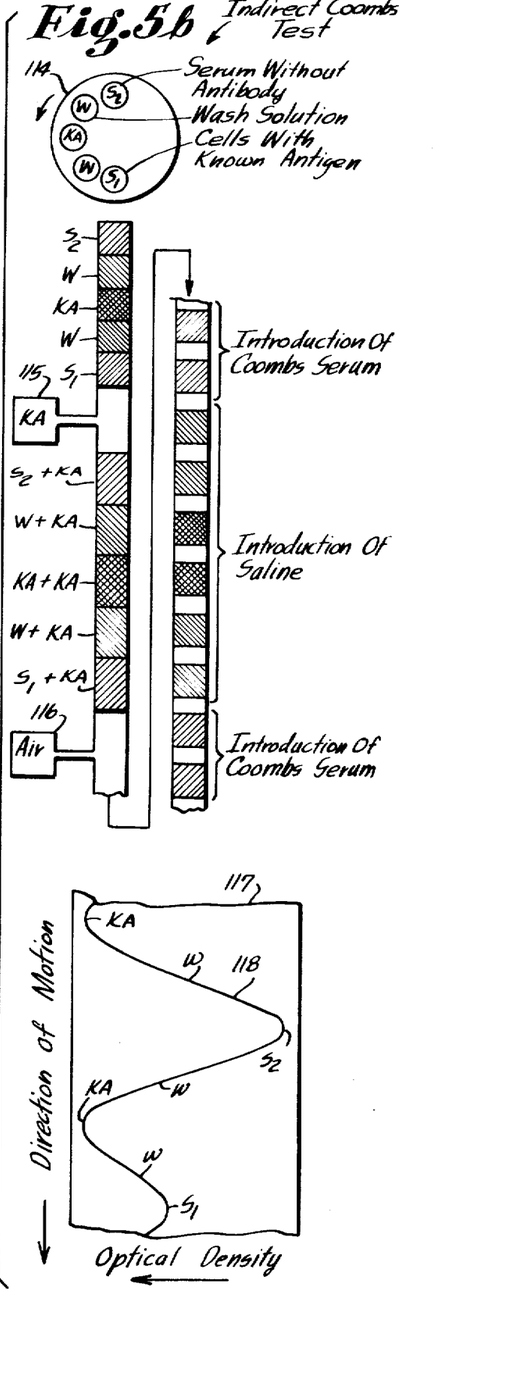

The constituent materials introduced into the apparatus shown in FIG. 4 are shown in FIG. 5a for the direct Coombs test and FIG. 5b for the indirect Coombs test. In FIG. 5a, a rotary wheel or disk 110 is shown having compartments containing uncoated red blood cells $C_1$, antibody coated red blood cells $C_2$ and wash solution labeled W. It will be appreciated that the wash solution need not be contained within the depressions of wheel 110 but may be obtained from a wash bath adjacent this wheel. The wash solutions are included on this wheel so that the appropriate timing or sequence of events may be readily understood. The sample probe of device 40 in FIG. 4 samples each one of these substances in the order shown at the top part of the column located under the wheel. Uncoated blood cells are introduced into the apparatus first, followed by wash solution and another series of uncoated blood cells. The uncoated blood cells serve to form a base line from which coated blood cells can be distinguished. After a series of uncoated red blood cells interspersed with wash solution are passed through the system, a further wash solution is introduced and cells to be tested for antibody coatings are then fed into the system. Each of these samples is then separated by a number of air bubbles. This air is shown injected at 111. Thus, each of the samples may be divided into as many as 20 or more separate parts depending on the air bubble pumping frequency. These separated samples pass through the subject apparatus and reach the point where the Coombs serum or saline is introduced. At this point, the valve timing program shown at 79 in FIG. 4 introduces the appropriate substance. This timing is shown by the arrows at the lower end of the column. The results of the introduction of samples in this order is shown in the strip chart diagram at the bottom of FIG. 5a. In this diagram, the direction of optical density is noted as well as the direction of motion of the strip chart. Line 113 represents the optical density of the materials moving through the colorimeter shown at 105 in FIG. 4. It will be noted that the uncoated red blood cells denoted as $C_1$ have a substantial optical density. The reason for this is that uncoated cells aggregate weakly or do not aggregate in the presence of Coombs serum. This leaves a great number of cells in the supernatant to be hemolyzed. When these cells are hemolyzed, they aggregate strongly thus being relatively opaque or dense. When the wash solution proceeds through the colorimeter, there will be of necessity some red blood cells floating therein. These red blood cells when hemolyzed and passed through the colorimeter have the optical density noted on the strip chart. Since there are less cells in the wash solution, the optical density of the wash solution is less than the optical density of the uncoated red blood cells. When, however, red blood cells having complementary antigen-antibody coatings are reacted with the Coombs serum, a great number of these cells are agglutinated and drawn off. This leaves a relatively weak concentration of cells in the supernatant fluid which is to be hemolyzed. When these relatively few cells are hemolyzed and passed through the colorimeter, their optical density, shown at $C_2$, is low.

The same type of reaction is shown for the indirect Coombs test. However, on wheel 114, in addition to serum without antibody $S_1$, serum with antibody $S_2$ and wash solution W, are cells with a known antigen. These cells are denoted by the symbols KA. Both the wash solution and the known cells help to reduce contamination from one serum sample to another. As was noted hereinbefore, serum and cells with known antigens are reacted together to ascertain if the particular serum has an antibody complementary to the known antigen. Cells with this known antigen are introduced at 115. Aliquots containing $S_1$ plus KA, W plus KA, KA plus KA, W plus KA and $S_2$ plus KA are shown in the column beneath wheel 114. Air is introduced to separate these samples at 116. These samples are shown to be separated by two air bubbles. In other words, each of the aliquots is divided into two aliquots of the same substance. It will be appreciated that these samples can be divided into any number of parts. The timing diagram for the introduction of Coombs serum and saline is shown to the right of this column. The results of passing the above components through the above apparatus are shown in strip chart 117 with the optical density and the direction of motion, likewise noted. The optical density is shown for the various components at line 118.

It will be appreciated that if, for instance, each of the samples were separated into five aliquots, the loss of one of these aliquots due to contamination due to improper reaction would not be fatal to the measurement. The reason for this is that as the samples are passed to the colorimeter, the air bubbles are removed. The removal of air bubbles between the above-mentioned five aliquots tends to cause the measurement to have an averaging effect if the speed of the strip chart recorder is kept low. The optical density of the aliquot which is lost when added to the optical densities of the other four aliquots will have little effect on the overall measurement. Serum without complementary antibody is shown to produce the optical density noted at $S_1$. This level forms the aforementioned base line for the indirect Coombs test and is due to the fact that there is no Coombs reaction. A great number of dissociated cells are produced at this point since there is no agglutination. The wash solution shown at W following $S_1$ on the strip chart has contaminant red blood cells from the following KA plus KA sample. These additional red blood cells add to the optical density as the wash solution proceeds through the colorimeter. The KA plus KA aliquots, having no antibody coating and no serum to dilute this sample, show a very high optical density. The height of these KA plus KA optical densities can also be used as a calibrating base line for the indirect Coombs test. Shown at $S_2$ is a deep base line depression due to a strong Coombs reaction. This strong reaction is due to the fact that the complementary antibodies in serum $S_2$ have coated the KA cells and strong agglutination has occurred. Almost all of the red blood cells are drawn off leaving very few to be hemolyzed and sent to the colorimeter.

The cells with known antigen, KA, also serve to absorb any stray serum which may be left lining the tubes of the subject apparatus. Thus, the KA cells act in combination with the wash solution to clean the apparatus, thus reducing the sample-to-sample contamination.

Figure 6:
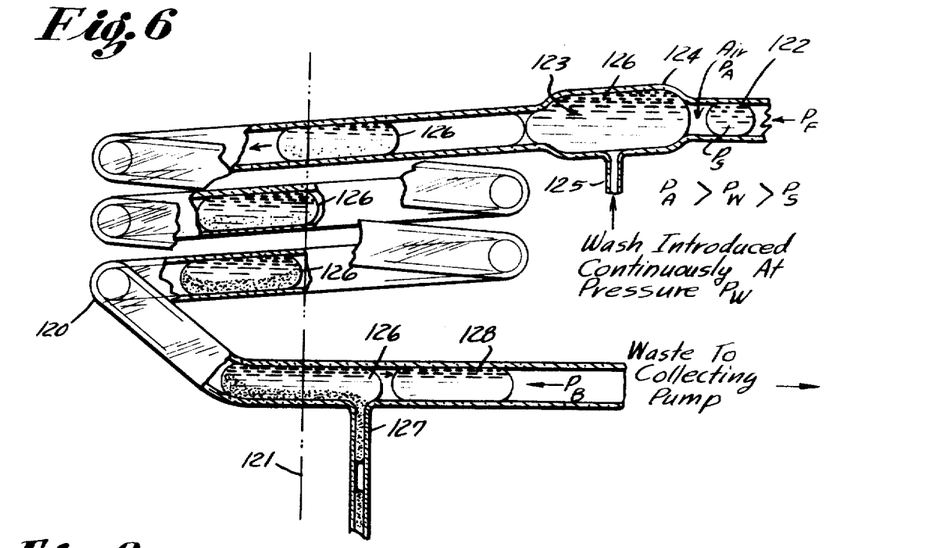
FIG. 6 is a cross-sectional drawing of the settling coil used in the apparatus shown in FIG. 4 as well as a diagram of the gravitational settling and decanting operation.

Referring to FIG. 6, a settling coil 120 is shown oriented so that its axis 121 is in a direction colinear with the local gravitational field direction. A serum-cell mixture 122 is shown entering the coil from the right. This mixture is undiluted and relatively dense. The pressure necessary to break into this aliquot with wash solution is shown to be $P_B$. As this aliquot moves into an expanded chamber 123 of fitting 124, wash solution is pumped upwardly and continuously at a pressure $P_W$ through tubing 125 into chamber 123 where it is allowed to mix with the blood serum mixture. It will be appreciated that this wash solution is being continuously pumped into chamber 123 without disturbing the air bubble separator because the pumping pressure, $P_W$, is less than the air pressure, $P_A$, in the air bubble separator. This diluted blood aliquot 126 proceeds slowly down the coil, with red cell aggregations forming and sinking to the bottom surface of the coil. While a coil is the most efficient geometric shape for use in the settling steps listed above, a straight length of tubing may be used or indeed any shape tubing so long as a lower interior surface is substantially perpendicular to the local gravitational force field.

Aggregated red blood cells are removed after they have settled through a restricted orifice conduit 127 passing through the lower interior surface of coil 120. It can be seen from this figure that the air separation is maintained in conduit 127. The supernatant material which includes a solution of nonspecific protein in low ionic wash solution is then decanted off at 128 by a slight suction. Back pressure $P_B$ due to the pressure differential between the forward pumping pressure $P_F$ and the slight suction is made sufficiently high so as to prevent the aggregated cells from being decanted off with the supernatant fluid.

The action of the settling coil is exactly the same when the reactants are Coombs serum and washed blood cells. Here, however, the agglutinated cells are removed from the system and the dissociated cells, forming the supernatant, are decanted off to be measured.

Figure 7:
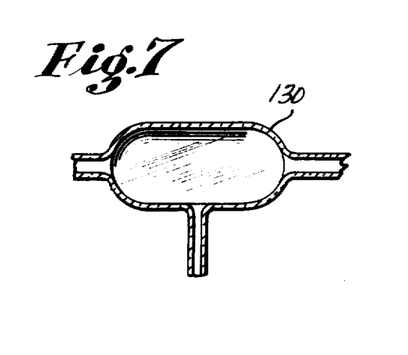
FIG. 7 is a diagram of an expanded chamber fitting used to introduce a large volume of wash solution into the serum-cell mixture.

At the top end of this coil, an expanded chamber fitting of the type shown at 130 in FIG. 7 is fastened. The expanded chamber is made greater than the diameter of the tubing used so as to ensure that enough wash solution is available to dilute the serum-cell mixture. This fitting is basically a T- or "h"-type fitting in which all entrance conduits are the same size. This fitting is used whenever a large amount of solvent must be used to dilute a given volume of soluble material.

Figure 8:
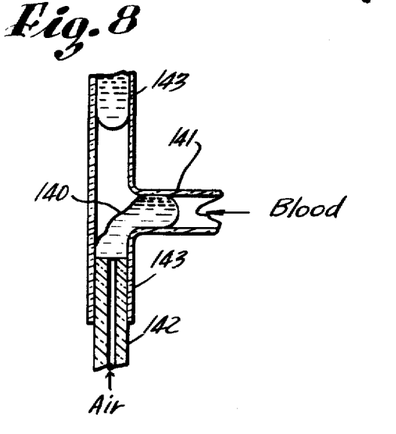
FIG. 8 is a diagram of a drip fitting which permits greater air bubble separation between samples introduced into the apparatus shown in FIG. 4.

FIG. 8 shows an enlarged diagram of drip fitting 44 of FIG. 4. The fitting is oriented vertically as shown so that blood or serum 140 will flow by gravity in through horizontal conduit 141 and downwardly to restricted orifice conduit 142 disposed within outer sleeve 143. Because the blood or serum must drop a finite distance before encountering the air, a larger separation is possible between the aliquot 143 and the immediately succeeding sample.

The fittings shown in FIGS. 7 and 8 substantially increase the efficiency of the apparatus; and although results may be obtained without the use of these fittings, their use is desirable in the air bubble separation and washing operations when a large number of samples are to be tested at a high rate.

Figure 9:
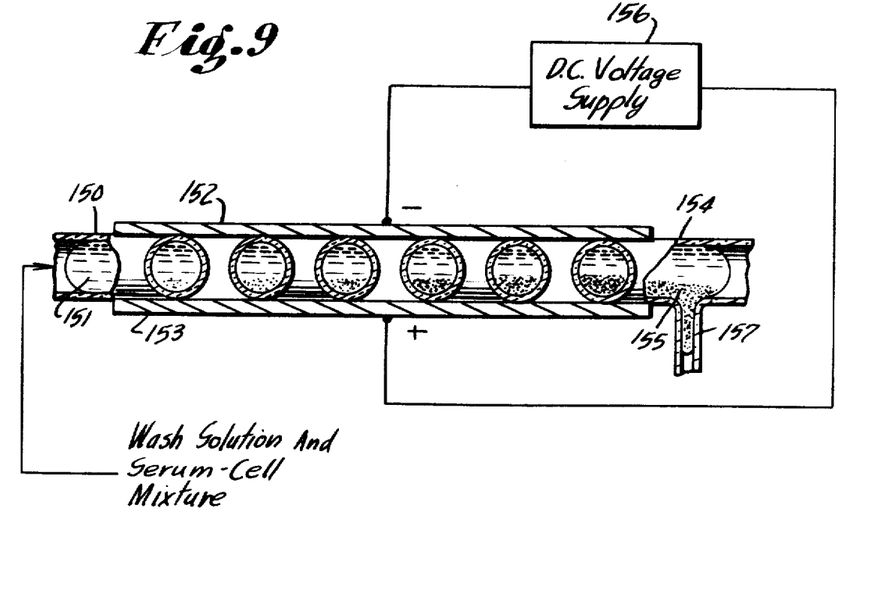
FIG. 9 shows apparatus for maintaining an electrostatic field across a settling coil.

FIG. 9 shows that the efficiency of the gravitational setting step may be enhanced by subjecting the coated cell-wash solution mixture to an electrostatic field. Since the red blood cells have a net negative charge, precipitation may be enhanced by subjecting these cells to an appropriately polarized electrostatic field. In addition, a saline wash solution is substituted for the low ionic solution used in the gravitational settling method. A cross section of a "snake-like" tube is shown at 150. It will be appreciated that any type of closed container may be used to receive the wash solution serum-cell mixture as long as aliquot flow and separation can be maintained. This flat snaking coil is shown sandwiched between two flat electrodes shown in cross section at 152 and 153. The bottom electrode is given a positive charge and the top electrode a negative charge by DC voltage supply 156. Charges in these two plates produce a force field which acts upon the negatively charged red blood cells forcing them in a downward direction as these cells proceed through the space between the electrodes. The aggregated cells shown diagrammatically at 155 are drawn off in the aforementioned manner by a decant fitting schematically shown at 157. As in the gravitational settling method, the supernatant fluid shown at 154 is decanted off by a slight suction.

Electrostatic fields may be used in both the wash cycle and the Coombs reaction cycle of the apparatus shown in FIG. 4. When electrostatic fields are introduced, the size of the settling coils may be reduced and a number of washing cycles eliminated.

What is claimed is:

1. In a system for washing red blood cells to remove preselected substances therefrom which employs a wash solution which counteracts the net electric repulsive force between these cells, the combination of:
   a plurality of flow-through fluid mixing devices, each having an input and output side;
   a like plurality of flow-through gravitational settling devices;
      each having an input and output side;
      said mixing and settling devices being interconnected with the output side of a first mixing device connected to the input side of a first settling device and the output side of this settling device connected to the input side of a second mixing device and so on to form an open-ended wash system;
   means for introducing a volume of red blood cells which are to be washed into one end of said wash system at the input side of said first mixing device and for introducing larger volumes of said wash solution into said wash system at the input side of this mixing device as well as the input sides of all other mixing devices; and
   means for decanting from the wash system the supernatant present at the output side of each settling device whereby those red blood cells which appear at the output side of the last settling device in the wash system have experienced a number of separate washing operations.

2. The wash system as described in claim 1 wherein each of said mixing devices comprises a first coil of tubing having a plurality of turns and each of said settling devices comprises a second larger diameter coil of the same size tubing having a plurality of turns,
   each settling device being oriented such that the individual turns thereof are disposed in spaced substantially horizontal planes.

3. The wash system as described in claim 2 wherein each of said mixing devices further comprises:
   a housing disposed upstream of said first coil, said housing having,
      an interior chamber aligned along a first axis;
      inlet and outlet ports centered on said axis and communicating with opposite ends of said interior chamber for respectively introducing red blood cells and for expelling a mixture of red blood cells diluted by wash solution;
      a wash solution inlet port communicating with said interior chamber at its geometric center for introducing wash solution therein, said interior chamber being larger in diameter than the internal diameters of said tubing.

4. The combination as recited in claim 2 wherein said means for decanting includes:
   a fitting comprising a housing having an interior channel being the same size as the bore diameter of said tubing and having a restricted diameter orifice communicating with said channel,
      said restricted diameter orifice oriented downwardly from said channel and communicating with the exterior of said housing.

5. In a system for washing predetermined substances from red blood cells with a wash solution in which said substances are soluble, the combination of:
- a plurality of flow-through fluid mixing devices, each having an input and an output;
- a like plurality of flow-through gravitational settling devices, each having an input and an output;
- means interconnecting the output of the first of said mixing devices to the input of the first of said settling devices, the output of said first settling device being connected to the input of a subsequent mixing device, the remaining devices being connected seriatim in similar fashion to provide an open-ended wash system;
- means for introducing a relatively small volume of red blood cells to be washed into the input of said first mixing device;
- means for introducing a relatively large volume of said wash solution into the inputs of all of said plurality of mixing devices;
- a source of direct voltage;
- electrodes connected to said source of direct voltage, said electrodes being disposed in proximity to said settling devices to set up an electrostatic field thereacross, said red blood cells being attracted in the direction of the electrode of polarity opposite that of the charge on said red blood cells; and
- means for decanting from the output of each of said settling devices supernatant there present,
  whereby red blood cells reaching the output of the last one of said plurality of settling devices have been subjected to a plurality of washing operations.

References Cited

UNITED STATES PATENTS

| | | | |
|---|---|---|---|
| 3,334,018 | 8/1967 | Smythe | 424—11 |
| 3,399,040 | 8/1968 | Ilg | 23—258.5 |
| 3,427,135 | 2/1969 | Pelavin et al. | 23—253 R |
| 3,452,924 | 7/1969 | Schlutz | 23—258.5 UX |
| 3,464,794 | 9/1969 | Isreeli et al. | 23—230 |
| 3,503,850 | 3/1970 | Dibelius | 195—1.8 |

MORRIS O. WOLK, Primary Examiner

B. S. RICHMAN, Assistant Examiner

U.S. Cl. X.R.

195—1.8; 210—83, 259; 424—11, 12